United States Patent
Husband et al.

(10) Patent No.: US 9,145,830 B2
(45) Date of Patent: Sep. 29, 2015

(54) TURBOMACHINE GEARED ARCHITECTURE SUPPORT ASSEMBLY

(75) Inventors: Jason Husband, South Glastonbury, CT (US); James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 440 days.

(21) Appl. No.: 13/487,661

(22) Filed: Jun. 4, 2012

(65) Prior Publication Data

US 2013/0320185 A1    Dec. 5, 2013

(51) Int. Cl.
| | |
|---|---|
| *F02C 7/36* | (2006.01) |
| *F02C 3/107* | (2006.01) |
| *F02K 3/06* | (2006.01) |
| F04D 25/02 | (2006.01) |

(52) U.S. Cl.
CPC . *F02C 3/107* (2013.01); *F02C 7/36* (2013.01); *F02K 3/06* (2013.01); *F04D 25/028* (2013.01); *F05D 2260/40311* (2013.01); *F05D 2260/90* (2013.01); *Y10T 29/49826* (2015.01)

(58) Field of Classification Search
CPC ... F04D 13/021; F04D 13/022; F04D 13/028; F04D 25/022; F04D 25/028; F04D 29/668; B64C 27/001; B64C 2027/002; F05D 2260/96; Y10T 464/50; Y10T 29/668
USPC ................ 415/119, 122.1, 124.1, 124.2, 229; 416/500
See application file for complete search history.

(56) References Cited

U.S. PATENT DOCUMENTS

| | | | |
|---|---|---|---|
| 5,288,204 A | 2/1994 | Adams | |
| 5,433,674 A * | 7/1995 | Sheridan et al. | 475/346 |
| 6,223,616 B1 | 5/2001 | Sheridan | |
| 6,944,580 B1 | 9/2005 | Blume et al. | |
| 7,270,620 B2 | 9/2007 | Tiesler et al. | |
| 7,694,505 B2 | 4/2010 | Schilling | |
| 7,704,178 B2 * | 4/2010 | Sheridan et al. | 475/159 |
| 7,926,260 B2 | 4/2011 | Sheridan et al. | |
| 7,950,151 B2 | 5/2011 | Duong et al. | |
| 8,529,197 B1 * | 9/2013 | Coffin et al. | 415/119 |
| 8,573,926 B2 * | 11/2013 | Coffin et al. | 415/119 |
| 2010/0105516 A1 * | 4/2010 | Sheridan et al. | 475/346 |
| 2011/0129334 A1 | 6/2011 | Wu | |
| 2011/0130246 A1 | 6/2011 | McCune et al. | |
| 2011/0286836 A1 | 11/2011 | Davis | |
| 2012/0121378 A1 | 5/2012 | Sheridan et al. | |
| 2013/0195604 A1 * | 8/2013 | Otto | 415/1 |

OTHER PUBLICATIONS

International Search Report and Written Opinion for International Application No. PCT/US2013/040536 completed on Feb. 27, 2014.
International Preliminary Report on Patentability for International Application No. PCT/US2013/040536 mailed Dec. 18, 2014.

* cited by examiner

Primary Examiner — Dwayne J White
Assistant Examiner — William Grigos
(74) Attorney, Agent, or Firm — Carlson, Gaskey & Olds, P.C.

(57) ABSTRACT

An example turbomachine geared architecture support assembly includes a compliant member configured to hold a geared architecture within a turbomachine. The compliant member has a compliant section that permits rotation of the geared architecture relative to a fixed portion of the turbomachine. A stop limits rotation of the geared architecture relative to the fixed portion of the turbomachine.

18 Claims, 6 Drawing Sheets

TURBOMACHINE GEARED ARCHITECTURE SUPPORT ASSEMBLY

BACKGROUND

This disclosure relates to limiting relative rotational movement of a turbomachine geared architecture support assembly during an extreme event.

Turbomachines, such as gas turbine engines, typically include a fan section, a turbine section, a compressor section, and a combustor section. Turbomachines may employ a geared architecture connecting the fan section and the turbine section.

Support structures are used to hold the geared architecture within the turbomachine. The support structures may be relatively compliant to accommodate some movement of the geared architecture relative to other portions of the turbomachine. Extreme engine events such as fan blade loss or failure of fan shaft bearing supports may significantly torque the geared architecture. It is desirable for compliant support structures to not buckle under such loads.

SUMMARY

A turbomachine geared architecture support assembly according to an exemplary aspect of the present disclosure includes, among other things, a compliant member configured to hold a geared architecture within a turbomachine. The compliant member has a compliant section that permits rotation of the geared architecture relative to a fixed portion of the turbomachine. A stop limits rotation of the geared architecture relative to the fixed portion of the turbomachine.

In a further non-limiting embodiment of the foregoing turbomachine geared architecture support assembly, the compliant member may hold the geared architecture such that the compliant member and the geared architecture are coaxially arranged about a common axis, and the relative rotation of the geared architecture is rotation about the axis.

In a further non-limiting embodiment of any of the foregoing turbomachine geared architecture support assemblies, the stop may comprise at least one cog that is received within a slot.

In a further non-limiting embodiment of any of the foregoing turbomachine geared architecture support assemblies, the at least one cog may comprise a plurality of circumferentially distributed cogs.

In a further non-limiting embodiment of any of the foregoing turbomachine geared architecture support assemblies, the compliant member may be secured to a torque frame configured to attach directly to the geared architecture, the at least one cog extending radially inwardly from the compliant member, the slot established in the torque frame.

In a further non-limiting embodiment of any of the foregoing turbomachine geared architecture support assemblies, the compliant member may be an annulus.

In a further non-limiting embodiment of any of the foregoing turbomachine geared architecture support assemblies, the compliant member may accommodate some axial and radial movements of the geared architecture during operation of the turbomachine. The movements are relative to other portions of the turbomachine.

In a further non-limiting embodiment of any of the foregoing turbomachine geared architecture support assemblies, the fixed portion of the turbomachine may comprise an engine case structure.

A turbomachine geared architecture support assembly according to another exemplary aspect of the present disclosure includes, among other things, a compliant member configured to permit movement of a geared architecture relative to a fixed structure of a turbomachine, and a stop that is configured to limit rotation of the geared architecture to prevent buckling of the compliant member.

In a further non-limiting embodiment of the foregoing turbomachine geared architecture support assembly, the stop may comprise at least one cog each configured to be received within a slot.

In a further non-limiting embodiment of either of the foregoing turbomachine geared architecture support assemblies, contact between the at least one cog and an edge of the slot may limit rotation.

In a further non-limiting embodiment of any of the foregoing turbomachine geared architecture support assemblies, the at least one cog may each extend from axially extending sections of the compliant member.

In a further non-limiting embodiment of any of the foregoing turbomachine geared architecture support assemblies, the compliant member may be directly secured to the fixed structure In a further non-limiting embodiment of any of the foregoing turbomachine geared architecture support assemblies, the compliant member may be an annulus.

In a further non-limiting embodiment of any of the foregoing turbomachine geared architecture support assemblies, the compliant member may be secured directly to torque frame that is directly attached to the geared architecture.

In a further non-limiting embodiment of any of the foregoing turbomachine geared architecture support assemblies, the compliant member may be axially aft the geared architecture relative to a direction of flow through the turbomachine.

A method of supporting a geared architecture in a turbomachine according to another exemplary aspect of the present disclosure includes, among other things, using a compliant member to permit rotations of a geared architecture relative to other portions of a turbomachine, and limiting rotation to prevent buckling the compliant member.

In a further non-limiting embodiment of the foregoing method of supporting a geared architecture in a turbomachine, the compliant member may be axially aft the turbomachine relative a direction of flow through the turbomachine.

In a further non-limiting embodiment of either of the foregoing methods of supporting a geared architecture in a turbomachine, the method may include a using a cog received within a slot to limit rotation.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
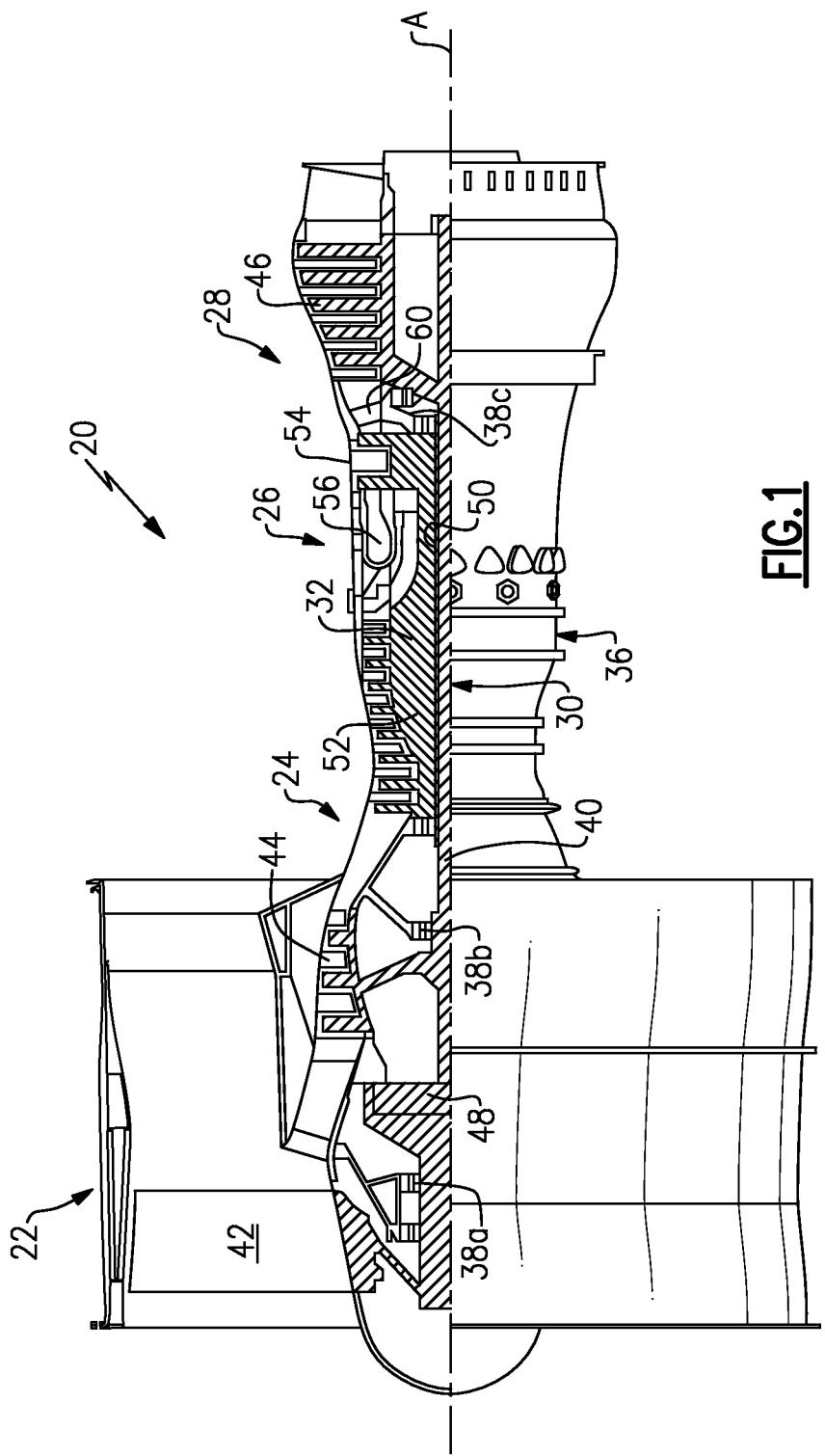
FIG. 1 shows a schematic section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmenter section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, the fan section 22 drives air along a bypass flowpath while the compressor section 24 drives air along a core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38a-38c. It should be understood that various bearing systems 38a-38c at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The combustion section 26 includes a circumferentially distributed array of combustors 56 generally arranged axially between the high-pressure compressor 52 and the high-pressure turbine 54.

A mid-turbine frame 58 of the engine static structure 36 is generally arranged axially between the high-pressure turbine 54 and the low-pressure turbine 46. The mid-turbine frame 58 supports bearing systems 38a-38c in the turbine section 28.

The inner shaft 40 and the outer shaft 50 are concentric and rotate via at least the bearing systems 38b-38c about the engine central longitudinal axis A, which is collinear with the longitudinal axes of the inner shaft 40 and the outer shaft 50.

In the example engine 20, the core airflow is compressed by the low-pressure compressor 44 then the high-pressure compressor 52, mixed and burned with fuel in the combustors 56, then expanded over the high-pressure turbine 54 and low-pressure turbine 46. The mid-turbine frame 58 includes airfoils 60 within the path of the core airflow. The high-pressure turbine 54 and the low-pressure turbine 46 rotatably drive the respective high-speed spool 32 and low-speed spool 30 in response to the expansion.

In some non-limiting examples, the engine 20 is a high-bypass geared aircraft engine. In a further example, the engine 20 bypass ratio is greater than about six (6:1).

The geared architecture 48 of the example engine 20 includes an epicyclic gear train, such as a planetary gear system or other gear system. The example epicyclic gear train has a gear reduction ratio of greater than about 2.3 (2.3:1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10:1), the fan diameter is significantly larger than that of the low pressure compressor 44, and the low-pressure turbine 46 has a pressure ratio that is greater than about 5 (5:1). The geared architecture 48 of this embodiment is an epicyclic gear train with a gear reduction ratio of greater than about 2 (2.5:1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example engine 20 is less than about 1150 fps (351 m/s).

Figure 2A:
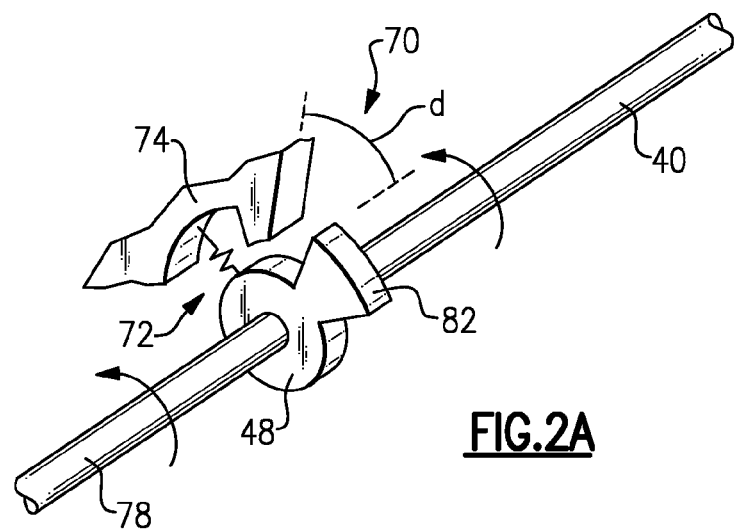
FIG. 2A shows a highly schematic view of an example geared architecture support assembly of the FIG. 1 turbomachine during normal operation.
Figure 2B:
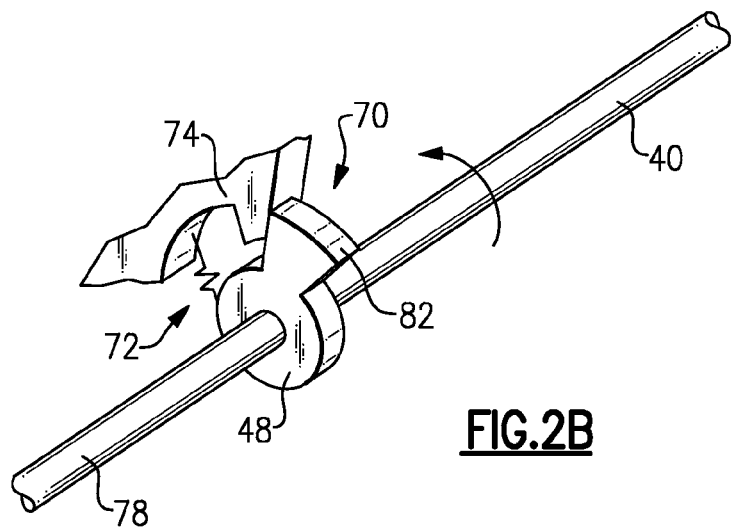
FIG. 2B shows a highly schematic view of the FIG. 2A geared architecture support during an extreme event.
Figure 3:
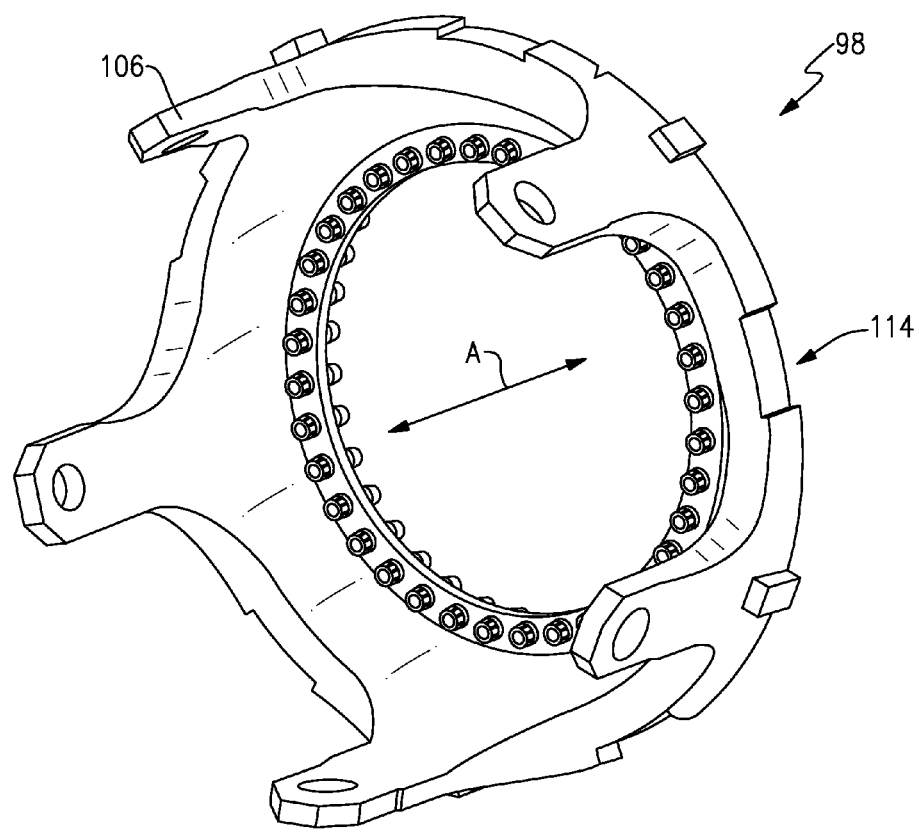
FIG. 3 shows a perspective view of a torque frame used in another example geared architecture support assembly.
Figure 4:
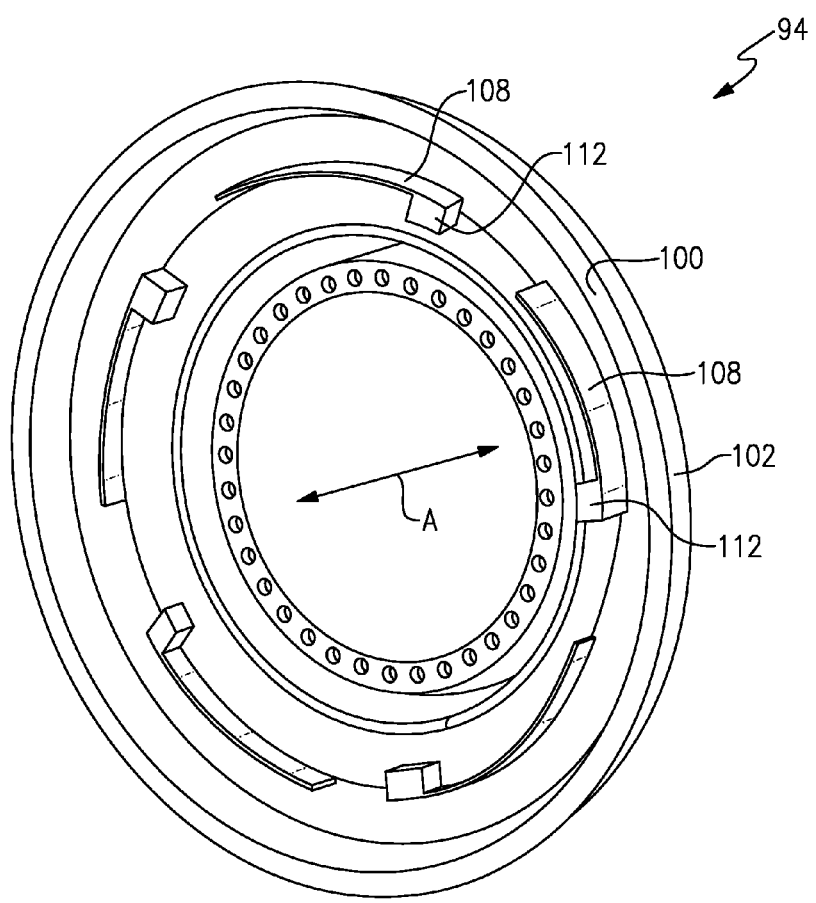
FIG. 4 shows a perspective view of a compliant member used with the torque frame of FIG. 3.
Figure 5:
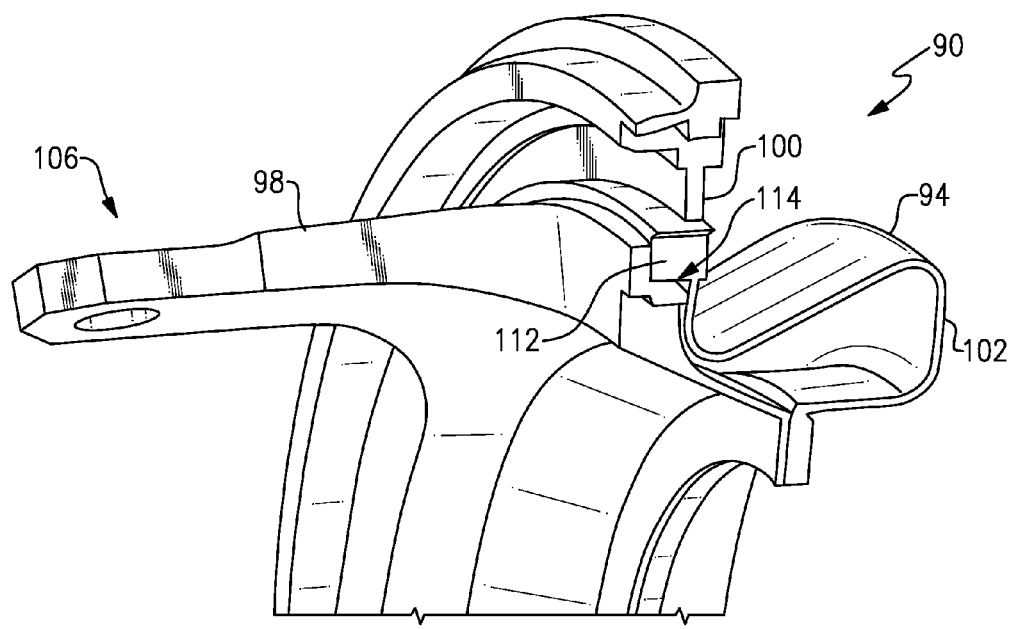
FIG. 5 shows a perspective sectional view of a portion of the example geared architecture support assembly incorporating the torque frame of FIG. 3 and the compliant member of FIG. 4.

Referring to FIGS. 2A and 2B with continuing reference to FIG. 1, the example engine 20 includes a geared architecture support assembly 70 having a compliant portion 72 that directly supports the geared architecture 48. The compliant portion 72 flexes to permit some movements of the geared architecture 48 relative to other, fixed portions 74 of the engine 20. Some movement of the geared architecture 48 relative to the fixed portions 74 of the engine 20 is necessary to accommodate, for example, assembly tolerances and flexing of the engine 20 during normal operation.

The geared architecture 48 rotatably couples a fan rotor 78 to the inner shaft 40. The fan rotor 78 rotatably drives the fan 42. The fixed portions 74 are considered fixed or rigid relative to the rotating portions of the engine 20. For example, the fixed portions 74 are fixed or rigid relative to the fan rotor 78.

During operation, the engine 20 may experience extreme events such as a loss of a fan blade of the fan 42 or a failure of a fan shaft bearing support 38a. In such events, rotation of the fan rotor 78 is limited or blocked. By contrast, other portions of the engine 20 tend to continue moving at operating speeds. This difference in speeds moves the geared architecture 48 relative to the inner shaft 40, which flexes the compliant portion 72. Severe flexing of the compliant portion 72 may cause the compliant portion 72 to buckle. Rotation of the example geared architecture support assembly 70 is limited during an extreme event to avoid severely flexing the compliant portion 72 during an extreme event, which is considered abnormal operation.

More specifically, in this example, the geared architecture support assembly 70 includes a stop that directly contacts the fixed portions 74 to limit movement of the geared architecture 48 (and portions of the geared architecture support assembly 70) relative to the inner shaft 40 during an extreme event. The stop is a cog 82 in this example. At times other than the extreme events, the cog 82 is spaced a distance d from the fixed portions 74.

In this example, the cog 82 extends radially outward from the geared architecture support assembly 70. In other examples, a cog instead extends radially inward from the fixed portions 74. Other examples do not include the cog 82, but instead includes some other feature that limits rotation of the geared architecture 48 relative to the fixed portions 74.

Referring now to FIGS. 3-6B, another example support assembly 90 suitable for use within the engine 10, includes a compliant member 94 and a torque frame 98. The torque frame 98 is attached directly to the geared architecture 48. The compliant member 94 allows movements of the geared architecture 48 (and the torque frame 98) during normal operation of the engine 20. The compliant member 94 is an annulus in this example and is axially aft the geared architecture 48 relative to a direction of flow through the turbomachine 10.

An attachment section 100 of the compliant member 94 is secured directly to the fixed (or static) portions 74 of the engine 20, such as the engine case. The attachment section 100 is relatively rigid, which grounds the compliant member 94. Other examples may ground the support assembly 90 in other ways. The compliant member 94 includes a compliant section 102 that can move and flex relative to the attachment section 100, which allows the torque frame 98 (and the geared architecture 48) to move and flex relative to the attachment section 100.

The example torque frame 98 includes five fingers with flexure mount 106 distributed circumferentially about the torque frame 98. The five fingers with flexure mount 106 directly connect to the geared architecture 48. The torque frame 98 fixes gears of the geared architecture 48 against free rotation, while allowing torsional flexure. In this example, the five fingers with flexure mount 106 directly engage a carrier of the geared architecture 48. The carrier supports five start gears of the geared architecture 48. The five star gears do not orbit about the axis A during normal operation.

In this example, the compliant member 94 includes five separate sections 108 distributed circumferentially about the axis A of the engine 20. The sections 108 extend axially from the compliant section 102.

A cog 112, a type of stop, extends radially inwardly from each of the sections 108. The cogs 112 are received within apertures, such as openings 114 or slots, in the torque frame 98. During an extreme event, the geared architecture 48 and the torque frame 98 rotate together relative to the compliant member 94. After sufficient rotation, the cogs 112 contact a wall 118 of the opening 114. Contact between the wall 118 and the cogs 112 limits further relative rotation of the geared architecture 48 and the torque frame 98.

Figure 6A:
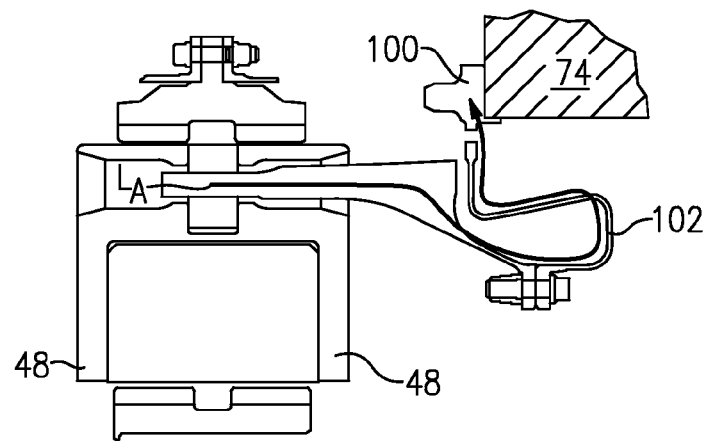
FIG. 6A shows a side sectional view of a portion of the example geared architecture support assembly incorporating the torque frame of FIG. 3 and the compliant member of FIG. 4 during normal operation.
Figure 6B:
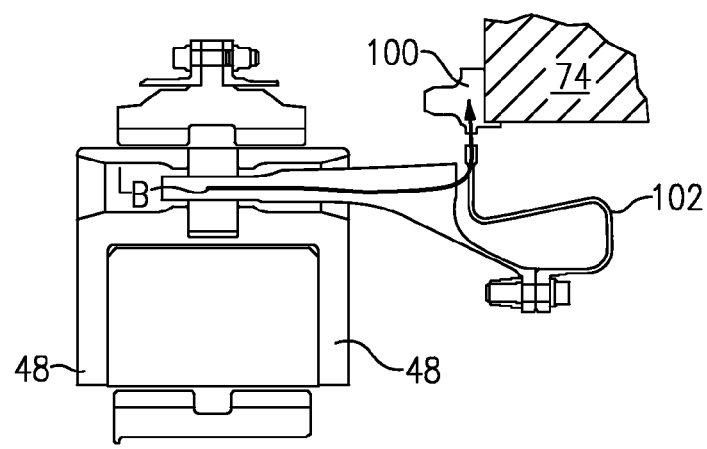
FIG. 6B shows a side sectional view of a portion of the example geared architecture support assembly incorporating the torque frame of FIG. 3 and the compliant member of FIG. 4 during an extreme event.

FIG. 6A shows the load path $L_A$ during an extreme event before the cog 112 contacts the wall 118. FIG. 6B shows the load path $L_B$ through the compliant member 94 during an extreme even after the cog 112 contacts the wall 118. As shown, the load after the cog 112 is driven directly into the fixed portions 74 of the engine 20 rather than through the compliant section 102.

In some examples, the amount of relative rotation required before the cog 112 contacts the wall 118 is controlled so that the compliant portion 102 does not buckle. That is, the cog 112 contacts the wall 118 prior to the compliant portion 102 buckling under torsional loading.

In one example, the geared architecture 48 has gear reduction ratio of 2.3 (2.3:1). In such an example, the fan rotor 78 rotates once for every 2.3 rotations of the inner shaft 40. The geared architecture 48 includes star gears that do not rotate about the axis A. During an extreme event, the geared architecture support assembly 70 allows the star gears within the geared architecture 48 to orbit slightly about the axis A. The star gears thus, for a brief time, perform like planet gears. The fixed gear ratio during an extreme event amplifies loading on the inner shaft. Allowing the star gears to perform like planet gears reduces the gear ratio and the loading.

Features of the disclosed examples include a support structure that permits some torsional movement of a geared architecture relative to other portions of an engine during normal operation of the engine, but limits movements during extreme events, particularly movements that torque the geared architecture.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine geared architecture support assembly, comprising:
   a compliant member configured to hold a geared architecture within a turbomachine, the compliant member having a compliant section that permits rotation of the geared architecture relative to a fixed portion of the turbomachine, wherein a stop limits rotation of the geared architecture relative to the fixed portion of the turbomachine during, exclusively, an extreme event, the stop extending radially inward from an axially and circumferentially extending section of the compliant member such that a radially innermost face of the stop is radially inside the entire axially and circumferentially extending section of the compliant member, wherein the axially and circumferentially extending section is radially thinner than the stop.

2. The turbomachine geared architecture support assembly of claim 1, wherein the stop comprises at least one cog that is received within a slot having a floor.

3. The turbomachine geared architecture support assembly of claim 2, wherein the at least one cog comprises a plurality of circumferentially distributed cogs, wherein the plurality of cogs each extend circumferentially a first distance, the plurality of cogs each received within respective slots extending circumferentially a second distance that is more than twice the first distance.

4. The turbomachine geared architecture support assembly of claim 2, wherein the compliant member is secured to a torque frame configured to attach directly to the geared architecture, the at least one cog extending radially inwardly from the compliant member, the slot established in the torque frame.

5. The turbomachine geared architecture support assembly of claim 1, wherein the compliant member is an annulus.

6. The turbomachine geared architecture support assembly of claim 1, wherein the compliant member accommodates some axial and radial movements of the geared architecture during operation of the turbomachine, the movements relative to other portions of the turbomachine.

7. The turbomachine geared architecture support assembly of claim 1, wherein the fixed portion of the turbomachine comprises an engine case structure.

8. A turbomachine geared architecture support assembly, comprising:
a compliant member configured to permit movement of a geared architecture relative to a fixed portion of a turbomachine during all phases of normal operation; and
a stop configured to limit rotation of the geared architecture to prevent buckling of the compliant member during abnormal operation,
wherein the stop comprises at least one cog each configured to be received within an opening that is at least partially defined by a radially facing floor,
wherein the at least one cog extends radially inward from an axially and circumferentially extending section of the compliant member such that a radially innermost face of the at least one cog is radially inside the entire axially and circumferentially extending section of the compliant member, the axially and circumferentially extending section radially thinner than the at least one cog.

9. The turbomachine geared architecture support assembly of claim 8, wherein contact between the at least one cog and an edge of the opening limits rotation.

10. The turbomachine geared architecture support assembly of claim 8, wherein the compliant member is axially aft the geared architecture relative to a direction of flow through the turbomachine.

11. A method of supporting a geared architecture in a turbomachine, comprising:
using a compliant member to permit rotations of a geared architecture relative to other portions of a turbomachine during all phases of normal operation,
limiting rotation to prevent buckling the compliant member exclusively during an extreme event; and
using a cog received within an opening to limit rotation, the opening having a floor, the cog extending radially inward from an axially and circumferentially extending section of the compliant member such that a radially innermost face of the cog is radially inside the entire axially and circumferentially extending section of the compliant member, the axially and circumferentially extending section radially thinner than the cog.

12. The method of claim 11, wherein the compliant member is axially aft the geared architecture relative a direction of flow through the turbomachine.

13. The method of claim 11, including using a cog received within an opening to limit rotation, the opening having a floor.

14. The turbomachine geared architecture support assembly of claim 2, wherein the slot is defined by, at least, a first wall facing in a first circumferential direction, a second wall facing in a opposite second circumferential direction, and the floor facing in a radial direction, the floor at least partially axially aligned with the cog.

15. The turbomachine geared architecture support assembly of claim 8, wherein the compliant member and the stop each include portions that axially overlap within the turbomachine.

16. The turbomachine geared architecture support assembly of claim 8, wherein the opening is defined by, at least, a first wall facing in a first circumferential direction, a second wall facing in a opposite second circumferential direction, and the radially facing floor that is at least partially axially aligned with the cog.

17. The method of claim 11, wherein the opening is defined by, at least, a first wall facing in a first circumferential direction, a second wall facing in a opposite second circumferential direction, and the floor facing in a radial direction, the floor at least partially axially aligned with the cog.

18. The method of claim 13, wherein the opening extends circumferentially a first distance, and the cog extends circumferentially a second distance that is less than half of the first distance.

* * * * *